No. 726,313. PATENTED APR. 28, 1903.
J. E. LENAHAN.
PANORAMIC PHOTOGRAPHIC CAMERA.
APPLICATION FILED DEC. 28, 1900.
NO MODEL. 2 SHEETS—SHEET 2.
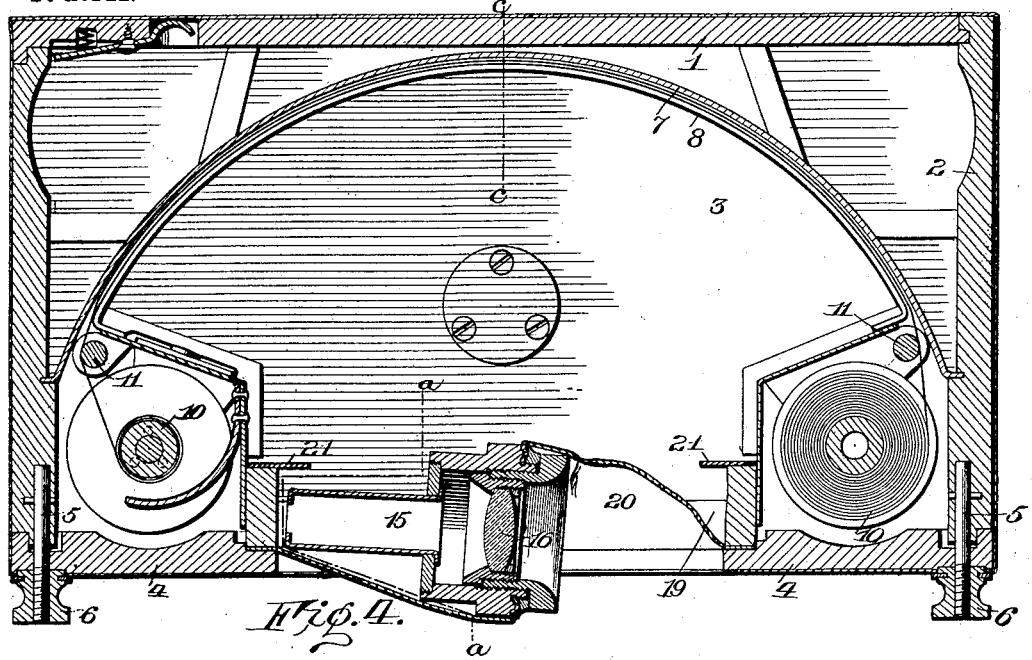
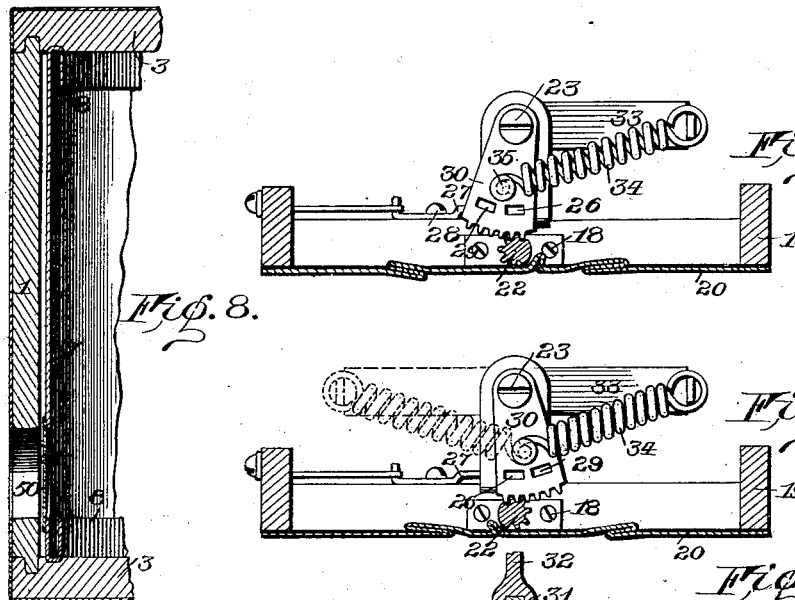
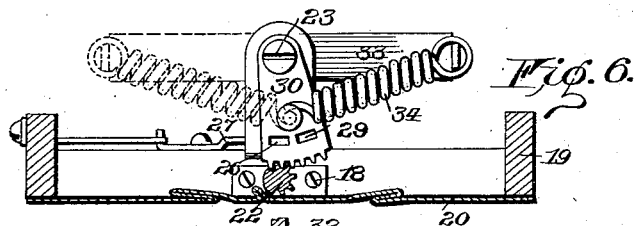
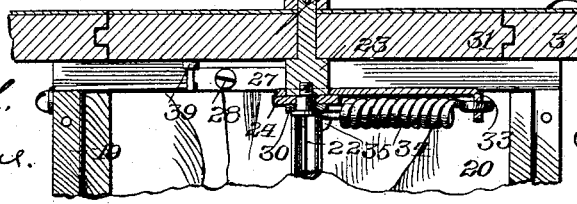
Witnesses. Inventor.

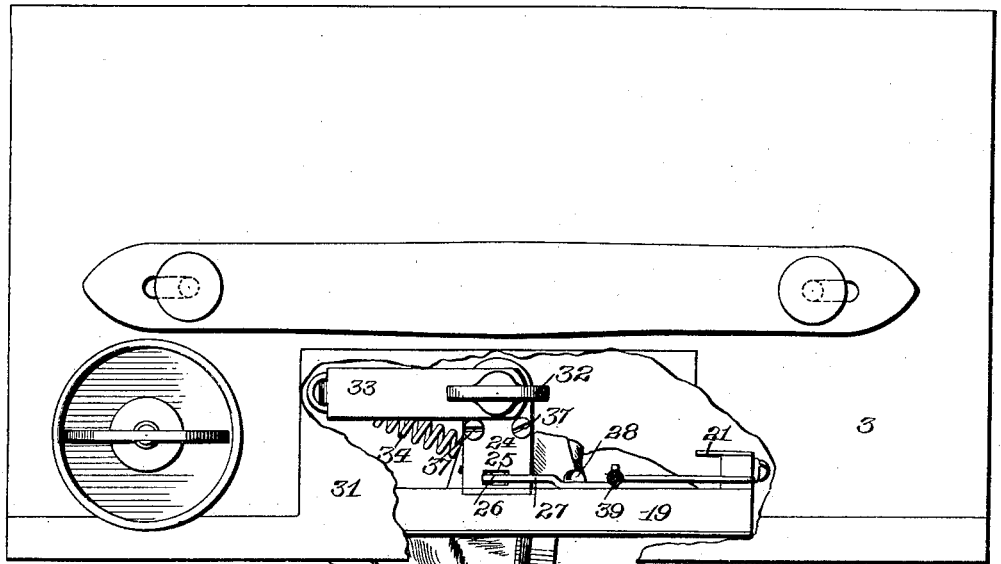

UNITED STATES PATENT OFFICE.

JOHN E. LENAHAN, OF ROCHESTER, NEW YORK, ASSIGNOR TO THE EASTMAN KODAK COMPANY, OF ROCHESTER, NEW YORK, A CORPORATION OF NEW YORK.

PANORAMIC PHOTOGRAPHIC CAMERA.

SPECIFICATION forming part of Letters Patent No. 726,313, dated April 28, 1903.

Application filed December 28, 1900. Serial No. 41,352. (No model.)

*To all whom it may concern:*

Be it known that I, JOHN E. LENAHAN, of Rochester, in the county of Monroe and State of New York, have invented certain new and useful Improvements in Panoramic Photographic Cameras; and I do hereby declare the following to be a full, clear, and exact description of the same, reference being had to the accompanying drawings, forming a part of this specification, and to the reference-numerals marked thereon.

My present invention has for its object to provide an improved panoramic camera in which different portions of the sensitized surface, such as photographic film, are successively exposed to the action of the rays of light passing through the lens, said lens and the shutter or tube containing it preferably rotating upon a vertical axis coincident with the lens center or at the point where the rays of light cross; and it consists in certain improvements whereby the shutter may be oscillated in opposite directions to make an exposure, thus obviating the necessity of capping the lens and resetting the shutter or exposing-tube, as heretofore; and to this end it consists in certain improvements in construction and combinations of parts, all as will be hereinafter described, and the novel features pointed out in the claims at the end of this specification.

In the drawings, Figure 1 is a plan view of a camera embodying my improvements, with a portion of the top broken away; Fig. 2, a vertical sectional view on the line $a\,a$ of Fig. 4; Fig. 3, a similar view on the line $b\,b$ of Fig. 2; Fig. 4, a horizontal sectional view; Fig. 5, a bottom plan view of the shutter-operating devices set for operation; Fig. 6, a similar view after the shutter has been operated; Fig. 7, a side elevation of the shutter-operating devices; Fig. 8, a vertical section on the line $c\,c$ of Fig. 4.

Similar reference-numerals in the several figures indicate similar parts.

The main body or casing of the camera may be of the usual or any preferred construction embodying the back board 1, the side boards 2, and top and bottom boards 3, and a removable front board 4, secured to the sides by fastening devices, such as screws 5 and nuts 6, coöperating therewith. Arranged within the casing is a curved plate 7, and at the upper and lower edges thereof film guides or flanges 8, serving to guide the film and black paper from one film-chamber 9 to the other on a curve that is concentric with the center of the lens. At the top and bottom of the rear portion of the casing and of the guides are apertures covered with red glass or celluloid 50, through which the indications on the paper forming part of the film-cartridge are visible to denote the quantity of film wound forward. The film-chambers are preferably removable, and centered therein are spools 10, of film and black paper, constituting the usual film-cartridges, and at the rear edges of the chambers are guide-rolls 11. Suitable devices are employed for winding the film-spools, which, however, are not of my invention and need not be specifically described.

The front board of the camera is provided with a central opening or aperture, and in the center of this is arranged an oscillatory tube 15, flaring toward the rear and carrying at the forward portion a suitable lens 16, said tube being adapted to swing in a horizontal plane with its rear end describing an arc concentric with the film-support, the lens being on the center from which such arc is struck and in line with the arbor extensions or pintles 17, journaled in brackets or supports 18, secured to the top and bottom of a supplemental frame 19, secured in rear of the opening in the front board. 20 indicates a flexible covering secured at the edges of the opening in the front board and connected to the forward end of the lens-tube to prevent the passage of light to the film excepting through the lens-tube as said tube is oscillated. The rear end of the tube 15 is adapted when an exposure is not being made and when the tube is at its extremes of movement to extend a little forward of the rear edges of the film-chambers and past either of two flexible flaps 21, so as to prevent the leakage of light to the film through the lens.

One end of one of the pintles 17 of the lens-tube, preferably the upper, is provided with a pinion or gear 22, with which meshes the teeth on a segmental lever or rack-plate 30, pivoted loosely upon a pintle or arbor 23, journaled in an aperture in a bracket or support 24, secured to the frame 19. This bracket is provided with an aperture 25, through which extends the projecting end 26 of a catch 27, pivoted at 28 and operated in a direction to engage either one of two apertures 29, formed in the segmental lever 30. The pintle 23 extends up through the top of the casing or of an extension 31 on the front thereof and is provided at the outer end with an operating-handle or thumb-piece 32, by which it may be rotated in either direction, and secured rigidly to said pintle, preferably above the bracket 24, is an arm or extension 33, to the outer end of which is connected one end of a spiral spring 34, the other end of the spring being connected to a pin or projection 35, on the segmental lever or rack-plate 30 at some distance from the center thereof.

The construction of the parts just described is such that when the arm 33 is in the position shown in Fig. 6 the spring is under some tension and will hold the lens-tube or exposing-tube turned to one side, with its end forward of one of the flaps 21 and the plate 30 held by the catch 27, this being the normal position after an exposure has been made. The film for an exposure having been wound forward and extending on a curve concentric with the center of oscillation of the tube, the operator sets the shutter by turning the handle 32, and through it the arm 33, over to the position shown in Fig. 5, this placing the spring under tension and tending to oscillate the plate 30 in the opposite direction across the center, the arm 33 engaging one of a pair of stops 37 on the bracket, and, as stated, the segmental lever or rack 30 is held by the catch 27. The exposure is made by pressing upon the catch 27 and releasing the segmental gear 30, when the spring will turn the latter, oscillating the tube and the rear opening moving across the film will permit the passage of rays thereto through the lens, as usual in devices of this description. In order to make another exposure, it is only necessary to wind forward more film, turn the handle 32 in the opposite direction from that last described, placing the spring under tension to turn the tube in the other direction and release the catch, as before.

This device is found in practice to operate admirably and to provide for making successive exposures without the necessity of capping the lens, and as the segmental gear, and through it the shutter, is locked by the catch after each exposure and while the spring is being placed under tension for another exposure there is no liability of accidental operation causing a second exposure, and but a single catch is required.

The operating end of the catch 27 might extend to the exterior of the casing, if desired; but I prefer to employ a push-button or pin 39, engaging the operating end and extending to the exterior of the casing for this purpose.

I claim as my invention—

1. The combination with the oscillatory apertured shutter member having the pinion, the lever having the segmental rack meshing with the pinion, the oscillatory arbor having the arm, and the spring connected to the arm and lever, of the spring-catch engaging the lever, and means for operating said catch to release it.

2. In a panoramic camera, the combination with a swinging lens-holder having the pinion, the pivoted lever having the teeth meshing with the pinion, the pivoted arm, the spring connecting the arm and lever and a single catch engaging the lever and holding it when swung in either direction.

3. The combination with the swinging tube and a pinion thereon having its axis of rotation at right angles to the plane of movement of the tube, a lever pivoted on an axis parallel with that of the pinion and having teeth meshing with the pinion, of a reversible arm pivoted on an axis parallel with that of the lever, a spring connected to the arm and lever to move the latter in opposite directions and a catch engaging the lever to hold it in either of two positions.

4. The combination with the pivoted reversible tube, of a mechanism for operating said tube in opposite directions on its pivot alternately embodying the lever engaging the tube, a pivoted reversible arm, the spring connecting the arm and lever, stops for limiting the movement of the arm in each direction and means for holding and releasing the tube.

5. The combination with the pivoted reversible tube having the pinion thereon, of the supporting-bracket having the aperture, the arbor journaled in the bracket, the segmental toothed lever pivoted loosely on the arbor and engaging the pinion, the arm rigid with the arbor, the spring connecting the arm and lever and the catch extending through the aperture in the bracket and engaging the lever.

6. The combination with the pivoted reversible tube having the pinion thereon, of the pivoted segmental rack engaging the pinion, the oscillatory arbor, the arm thereon, the spring connecting the arm and lever, and the catch engaging the lever and preventing its operation in either direction.

JOHN E. LENAHAN.

Witnesses:
FRANK A. BROWNELL,
G. WILLARD RICH.